Figure 1:
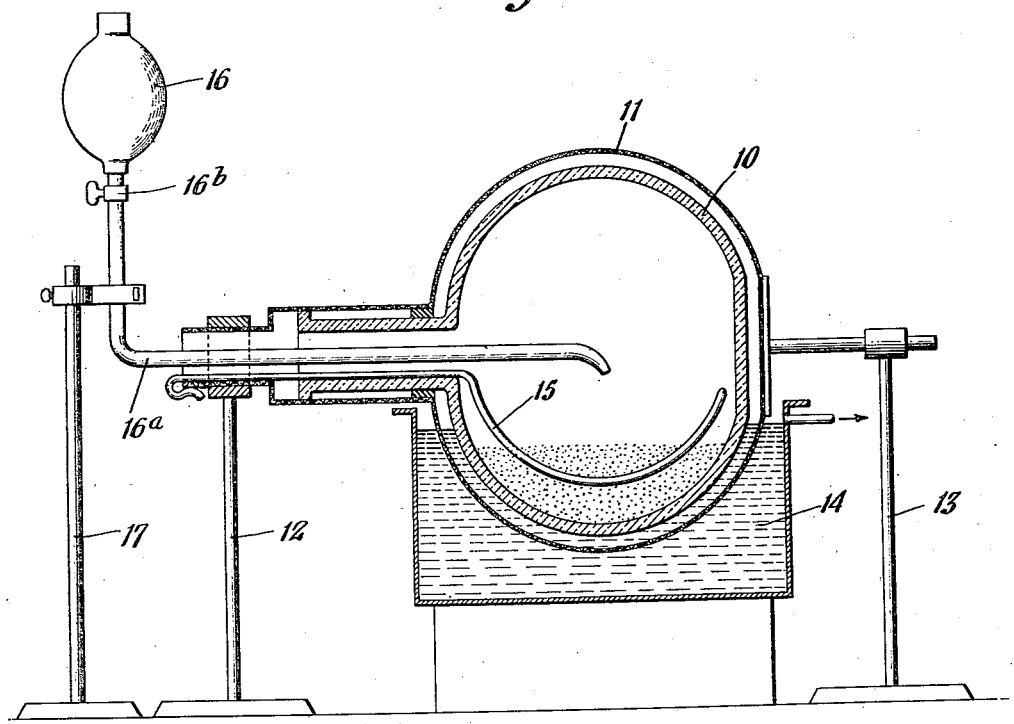

March 13, 1945. J. G. DEAN ET AL 2,371,427
MANUFACTURE OF ZEOLITIC MATERIALS
Filed Oct. 28, 1943   2 Sheets-Sheet 1

INVENTORS
JOHN GILBERT DEAN
RANDALL HEILIGMAN
RAY RILEY
BY Clarence D. Kerr
ATTORNEY March 13, 1945. J. G. DEAN ET AL 2,371,427
MANUFACTURE OF ZEOLITIC MATERIALS
Filed Oct. 28, 1943 2 Sheets-Sheet 2

INVENTORS
JOHN GILBERT DEAN
RANDALL HEILIGMAN
RAY RILEY
BY Clarence D. Kerr
ATTORNEY Patented Mar. 13, 1945

2,371,427

UNITED STATES PATENT OFFICE 2,371,427

MANUFACTURE OF ZEOLITIC MATERIALS

John Gilbert Dean, Pittsburgh, and Randall Heiligman, Philadelphia, Pa., and Ray Riley, Birmingham, N. J., assignors to The Permutit Company, New York, N. Y., a corporation of Delaware Application October 28, 1943, Serial No. 507,922

7 Claims. (Cl. 252—179)

This invention relates to the preparation of carbonaceous cation exchange products suitable for use in water softening and other water conditioning and ion exchanging processes where an exchange of cations is desired.

There have been developed recently certain carbonaceous or organic ion exchange products prepared by treating a carbonizable organic substance with a strong dehydrating agent such as sulfuric acid. In some cases, organic substances having no capacity for ion exchange reactions in their original condition are given this capacity by such a treatment. Other materials, such as lignite, may have their natural capacity for ion exchange reactions greatly increased by such a treatment.

The control of the reaction, however, between the organic substance and the sulfating or sulfonating agent has a great deal to do with the ultimate capacity for ion exchange reactions of the final product. Also, it has been found that the proper selection of the raw carbonaceous or organic material, and of the sulfating agent have an important effect on this ultimate capacity as well as on the physical properties of the product. The term "sulfating" as used herein is used in its broad sense including sulfonation as well as sulfation, inasmuch as the exact reactions taking place in this process are highly complex and may involve either or both of these factors.

The formation of a granular ion exchange product consisting of granules that are strong and durable is important for most purposes, so that when used in the form of a bed through which water or other liquids are passed, the granules will have a good resistance to physical disintegration. In the use of such a product in the form of a bed, a quantity of the liquid to be treated is first passed through the bed, and after the capacity of the exchange material has become depleted, this flow is stopped. A regenerating solution may then be brought into contact with the bed, followed by a suitable wash before resuming the passage of the liquid to be treated. The granules during these different steps are subjected to a considerable amount of agitation, rubbing against one another and the sides of the container, and if they are too soft they disintegrate rapidly, forming fine particles that are washed out of the bed during regeneration. The hardness and durability of the product are very important, therefore, if the product is to be used in the form of a bed of granules.

One object of this invention is to prepare a carbonaceous ion exchange product consisting of hard and durable granules having a high capacity for ion exchange reactions.

A further object is the selection of proper raw carbonaceous materials and concentrated sulfating reagents to produce the best hardness of granules in combination with a high ion exchange capacity.

Another object is to prepare a good carbonaceous ion exchange product in such a manner that optimum results are obtained by control of the rate of the reaction and the temperature thereof.

A further object of the invention is the application of sulfuric acid to coal in such a manner as to obtain a thorough and even distribution of the acid without allowing the temperature produced by the reaction to rise so high that the properties of the product are impaired.

A further object of the invention is the treatment of the product after reaction with the sulfating reagent as aforesaid to produce a permanent shrinkage thereof with an attendant increase in the ion exchange capacity per unit volume of product.

A number of factors have been found to be very important in obtaining a satisfactory ion exchange product by sulfating carbonaceous material. A wide variety of methods can be utilized for producing operative materials, but to obtain the best results, both with respect to the physical character and hardness of the final product as well as the ion exchange capacity thereof, it has been found that the raw materials must be carefully selected and the reaction between the carbonaceous material and the sulfating reagent must be carefully controlled.

Various sulfating reagents may be employed, such as different strengths of sulfuric acid, fuming sulfuric (oleum), pyrosulfuric, chlorosulfonic acid, etc., and in general, the stronger sulfuric acid or sulfating agent employed, the higher will be the ion exchange capacity of the final product. For example, 100% sulfuric acid produces a higher exchange capacity than 93% sulfuric acid, and fuming sulfuric acid in turn produces a higher exchange capacity than is obtained with 100% sulfuric acid.

In the treatment of bituminous or semi-bituminous coal, which are particularly good raw carbonaceous materials for this purpose, it has been discovered, however, that the use of sulfuric acid containing a substantial quantity of water produces a fairly soft final product compared with a product made with 100% sulfuric acid. On the other hand, the use of a fuming sulfuric acid, while it tends to produce a slightly softer product, also produces a substantially higher ion exchange capacity than is obtained with 100% sulfuric acid. For practical purposes, therefore, taking into consideration both the ion exchange capacity and the physical hardness of the granules in the final product, it is preferred to use as a sulfating agent a fuming sulfuric acid such as 20% or 60% fuming sulfuric acid.

In addition to bituminous and semi-bituminous coal, other coals such as anthracite, cannel coal and brown coal or lignite are suitable raw carbonaceous materials for the process of this invention. By the term "coal" as used herein, is meant both the bituminous and anthracite type of black coals and also brown coal or lignite. Different grades of lignites and of the black coals are available, and in general it is preferable to use a coal having a low moisture content and a relatively high content of volatile matter. Considerable moisture in the coal, like the presence of moisture in the acid employed, tends to produce a soft granule product, and if the coal has a moisture content of about 5% or more, it is generally desirable to dry the coal to a moisture content of about 2% or less before it is treated with the sulfating agent.

Considered both from the viewpoint of obtaining a high exchange capacity and a granular product with good physical properties, a suitable grade of relatively dry bituminous coal is considered preferable as a raw carbonaceous material for the process.

The coal should be granulated before treatment in order to obtain an even, complete reaction and, a uniform hard product of high exchange capacity. While the particular initial particle of granule size is not critical, it is desirable to use as finely granulated coal as is compatible with producing a final product of the required grain size. Coal granulated to about 30 to 50 mesh is very satisfactory for this purpose, although a portion of the coal may be slightly finer and/or coarser than this range. In general, the best results are obtained by starting with a granulated coal that will produce a final product, the bulk of which ranges in size from about 10 to 50 mesh. If any of these particles are too large, they can, of course, be crushed to a suitable size.

Two forms of apparatus for reacting coal with sulfuric acid are illustrated in the accompanying drawings, in which Figure 1 is a vertical section of a suitable apparatus for reacting coal with sulfuric acid and controlling the temperature of the reaction to obtain a good grade of ion exchanging material.

Figure 2:
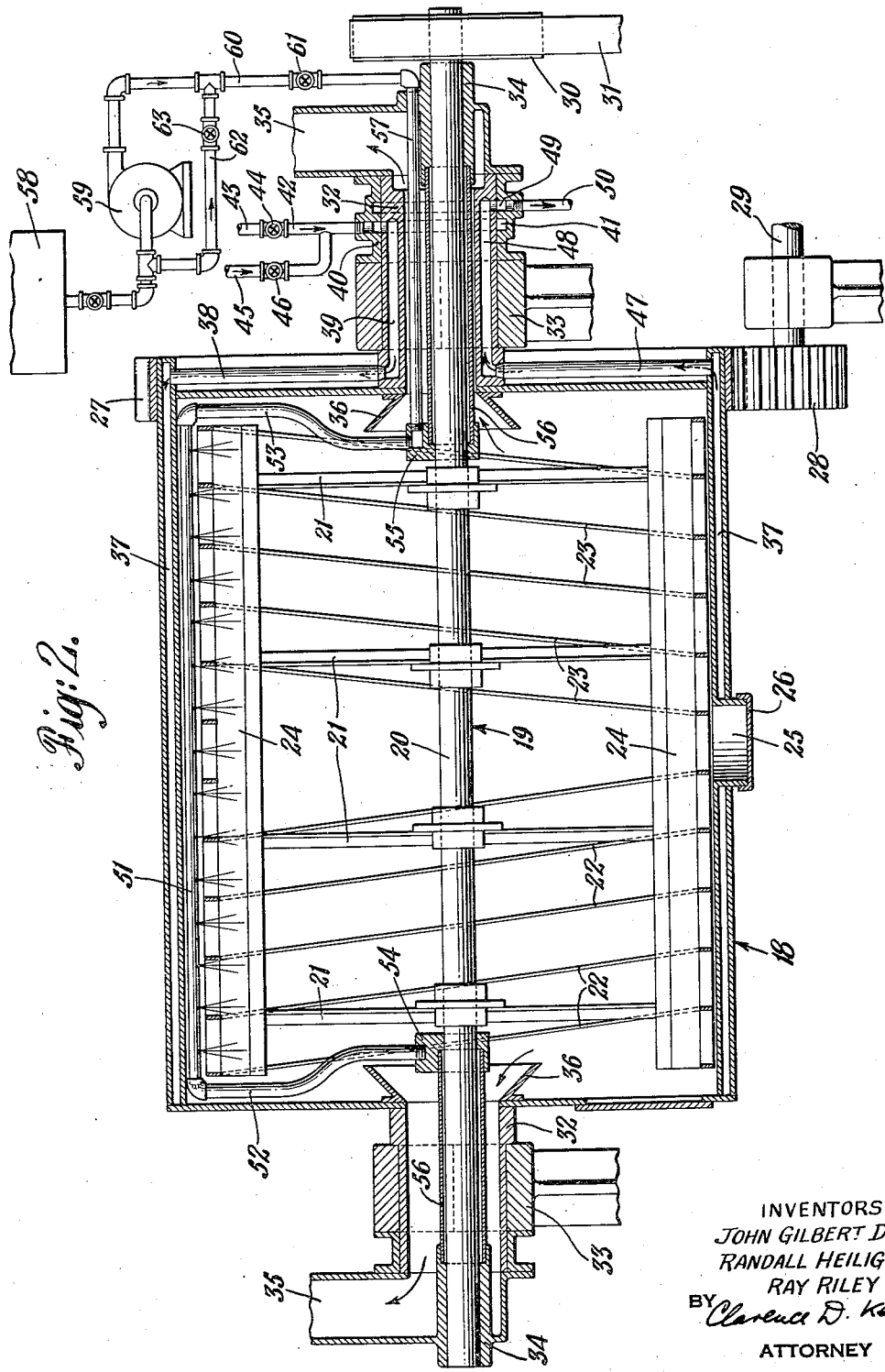

Figure 2 is a central vertical section of a different form of apparatus for this process in which the acid may be sprayed under pressure onto the coal.

It has been found that the best results, particularly with respect to ion exchange capacity, are obtained if the temperature and rate of reaction are closely controlled. For example, the temperature of the mass rises during the reaction, and should be allowed to rise, to a point substantially above 60° C. It is best, however, to avoid letting the temperature of the mass go above about 150° C. for any substantial period of time since higher temperatures than this have a tendency to destroy the exchanging capacity of the final product. For the best results, it is desirabel to keep the temperature of the reaction within the range of about 75 to 100° C. during the major portion of the period of reaction.

The total amount of acid employed may vary widely although little or no advantage is obtained by using a weight of acid computed as $SO_3$ that is more than about five times the weight of coal being treated. On the other hand, the minimum weight of acid that can be used depends on the kind of acid employed, the technique of adding it to and mixing it with the coal and the ion exchange capacity required in the final product. If the acid is simply poured on the coal it is generally desirable to use about two parts, or more, of acid computed as $SO_3$ per part of coal, but lower proportions of acid can be used. For example, less than one part of acid per part of coal produces a product that can be used commercially when the acid is sprayed on the coal and the reaction is carefully controlled. However, somewhat better exchange capacities are produced when larger quantities of sulfating agent are employed.

It has been found that a slow addition of the acid to the coal over a substantial period of time produces a very good ion exchange capacity and offers a convenient way to control both the rate and temperature of the reaction. The acid may be added in a continuous stream, or drop by drop, or it may be added in increments with suitable intervals of time between the different additions. The reaction between the coal and acid is exothermic and if the temperature rises too fast, the reaction proceeds at such a rate that the ion exchanging capacity of the product is seriously impaired even though external cooling be applied to the mass during the treatment.

Especially good results have been obtained by a process involving the spraying under pressure of a small portion of the acid on the coal followed by a period of reaction, then spraying another small portion of the acid on the reacting mass, allowing the reaction to proceed, and so on until all of the acid has been added to the coal. This step by step spraying of the acid on the coal at spaced intervals provides an excellent way to control the reaction without requiring heating or cooling of the mass during the reaction. In other words, the rate and temperature of the reaction can thus be readily controlled within the desired limits simply by varying the portions of acid used and the intervals between these additions. Spraying the acid also furnishes a very effective means of obtaining a uniform distribution of acid throughout the entire mass of coal.

Referring now to the apparatus shown in the drawings, the apparatus in Figure 1 comprises a flask 10 within a wire basket 11 that is supported by the standards 12 and 13 for rotation. The flask 10 and surrounding basket 11 may be partially submerged in any suitable constant temperature bath 14, and may be rotated mechanically or by hand. Agitation of the contents of the flask may be obtained by means of the wire 15 projecting into the interior of the flask 10 and fastened to the end of the basket 11 so as to rotate with the flask and basket. Liquid sulfating reagent may be supplied by gravity to the flask 10 from a suitable elevated container, such as the dropping funnel 16, through the tube 16a, the rate of flow being controlled by a valve 16b. The dropping funnel 16 and tube 16a may be supported by the usual type of ringstand or other convenient means.

In the operation of this device, 1 lb. of coal, such as bituminous coal, preferably having a moisture content of 2% or less and in a granular form ranging in size from 10 to 40 mesh, may be placed in the flask 10. Enough acid to supply 3.4 lbs. of $SO_3$ is then placed in the dropping funnel 16, and the valve 16b is opened part way.

For example, if 20% fuming sulfuric acid is employed, a total of 4.0 lbs. of acid will have to be added to the coal in order to supply 3.4 lbs. of $SO_3$. This 4.0 lbs. of 20% fuming sulfuric acid may be added slowly by allowing a thin, continuous stream of acid to flow out of the tube 16a into the flask 10 until all of the acid has been added to the coal, or the acid may be divided into two or more portions and allowed to run into flask 10 at intervals with suitable period of reaction, accompanied by agitation if necessary, between the acid additions.

One convenient method is to divide the acid into three equal parts, the first part being allowed to run slowly into the flask 10 and the flow of acid being then shut off. The temperature of the coal and portion of acid added thereto will rise due to the exothermic reaction, but may be easily held within the desired limits, preferably below 100° C., by regulating the size of the portions, the rate at which they are run into the flask, and by rotating the flask and wire agitator 15 as needed to cool the reaction mass.

After the reaction has slowed down or has continued for a sufficient length of time, the second portion of acid is allowed to run from the tube 16a into the flask 10, and the temperature of the mass again rises. The reaction is again allowed to continue for a suitable period of time, when the last portion is added and the reaction is continued until it is complete.

The addition of the acid preferably proceeds slowly, and the interval of reaction that should be allowed between the different additions will vary to some extent with different conditions. Under ordinary conditions, however, the first batch of acid amounting to 1.33 lbs. may be added slowly over a period of twenty minutes with or without agitation and the batch is then allowed to stand for an additional ten minutes before the addition of the second batch of acid. This second portion of acid may be added in about fifteen minutes, followed by an additional fifteen minutes of reaction, and finally the last batch of acid may be added during a period of about fifteen minutes. After a total reaction time of 2 to 2½ hours, the reaction mass in the flask 10 should be removed, the relatively concentrated acid separated therefrom, and the solid product washed until it is relatively free from excess acid.

Ordinarily proper washing of the solid product requires at least about 2 to 3 hours of washing with water. At the end of this time, the product may be treated with a solution of soda ash and converted to a sodium exchange zeolitic material, or it may be left in the hydrogen exchanging condition. In either case, the product preferably is then dried to produce a permanent shrinkage. Drying of the product may be carried out in the air, although drying at about 90 to 100° C. is preferable.

When the product is dried at about 90 to 100° C., either in its original condition as a hydrogen exchanging zeolitic material or as a sodium exchanging zeolitic material, a considerable amount of permanent shrinkage takes place. In other words, the product when dried to a moisture content of 1 to 30% on the wet basis is considerably shrunk, sometimes to only one-half of its original volume. When this dried material is then wetted again, it swells to some extent but never returns to its original volume.

An actual increase in exchange capacity per unit volume of about 7 to 20% can be obtained by this shrinkage treatment.

Instead of adding equal portions of the 4.0 lbs. of fuming acid to the coal as described above, it may be desirable to add a smaller portion of acid to the coal at first and thereafter increase the portions of acid added, because the rate of reaction and temperature rise is greatest during the first stages of the treatment. For example, the 4.0 lbs. of 20% fuming sulfuric acid instead of being divided into equal portions may be added in lots of 1 lb., 1.4 lbs. and finally the balance of 1.6 lbs. This addition of a smaller portion of the acid during the first stages of the reaction is particularly helpful in making it easier to prevent the temperature from rising above a point at which the exchange capacity of the final product is impaired.

The foregoing examples refer to the addition of 20% fuming sulfuric acid, which is preferred in order to obtain a high exchange capacity in the final product together with a good physical structure or hardness in the granules.

If desired, of course, acid containing a small portion of water may be employed with the production of softer granules and lower exchange capacity, or 100% acid may be used with the production of slightly harder granules but lower exchange capacity. Other strengths of fuming sulfuric acid may, of course, be used with good results in place of the 20% fuming. In any case, an appropriate adjustment in the amount of acid used should be made in order to supply the proper weight of $SO_3$.

Products having good ion exchange capacities and physical properties may also be obtained by adding 100% sulfuric acid as the first portion of the acid, then adding a portion of acid containing somewhat more $SO_3$ such as 10% fuming sulfuric acid to the reaction mass and finally, for the third addition, adding a still stronger fuming acid such as 20% fuming sulfuric acid. Appropriate weights of these different types of acid would be employed, of course, in order to supply the requisite total ratio of $SO_3$, based upon the weight of coal being treated.

For preparing large batches of the product, it may be desirable to employ an apparatus such as illustrated in Fig. 2, comprising a rotary drum 18 provided with an independently rotatable agitator 19 made up of the shaft 20 with fixed radially extending arms 21 carrying the helical blades 22 and 23, and longitudinal paddles or lifters 24 welded or otherwise secured thereto. The helical blades 22 and 23 are inclined in such a way as to move the charge in the drum 18 towards its center, so that the charge can be withdrawn through the opening 25. This opening 25, closed during operation by the cover 26, may also be used for placing the initial charge of coal in the drum.

The drum 18 may be fitted with a ring gear 27 driven by a spur gear 28 on shaft 29 driven from any suitable source of power (not shown). Shaft 20 of the agitator 19 may be driven independently from the same or different source of power (not shown) through the pulley 30 and belt 31.

The drum 18 is supported for rotation by the hollow trunnions 32 carried in bearings 33 while the shaft 20 projects through the trunnions 32 and is mounted for rotation in the fixed bearings 34. Suitable packing glands may, of course, be employed to provide tight joints at these points.

Fumes from the reaction in the drum may be drawn off through the hollow trunnions 32 to the pipes 35 and thence carried to a stack or other exhaust means (not shown). The conical shields 36 projecting into the drum prevent the charge from clogging these openings for fumes. If needed, the drum may also have a double outer wall forming the jacket 37, and the jacket can be supplied with a heating or cooling medium as required through the pipe 38 and the communicating passage 39 in one of the trunnions 32. Surrounding this trunnion and communicating with passage 39 is a casting 40 having an annular groove 41 with an inlet pipe 42 connected thereto. Cold water may be supplied through pipe 43 controlled by valve 44 and steam or hot water supplied through pipe 45 controlled by valve 46. The heating or cooling medium may be drawn off from jacket 37 through pipe 47, trunnion passage 48, a second annular groove 49 in casting 40, and the pipe 50.

It will be noted that the shaft 20 is mounted eccentrically of the drum trunnions 32 to provide room above the agitator 19 for the longitudinal acid spray pipe 51. This spray pipe may be supported in position by the supporting pipes 52 and 53 fixed to bearing blocks 54 and 55 on shaft 20 inside the drum. These bearing blocks in turn may be held stationary by the sleeves 56 fixed to bearings 34.

Spray pipe 51 may be plugged at one end and provided with spaced nozzles or openings at suitable intervals directly downwardly into the drum. Acid is supplied through the supporting pipe 53 and the feed pipe 57 communicating therewith. An overhead storage tank 58 may be employed to store acid with a pump 59 for delivering the acid under pressure, through pipe 60 and the pressure control valve 61. With an elevated storage tank 58, the acid can be run into the drum 18 by gravity in case of emergency by simply using the by-pass line 62 around the pump. Normally, however, the valve 63 in this by-pass would remain closed.

In the operation of this device, a suitable charge of coal granules is placed in the drum through the opening 25 and the cover 26 is secured in place. The agitator 19 and the drum 18 may then be started rotating in the same direction at approximately the same speed. If needed, the drum 18 may be pre-warmed by passing warm water through the jacket 37 although this usually will not be necessary.

A relatively small portion of the acid to be employed is now sprayed under pressure on the coal granules while the drum 18 and agitator lifters 24 are continuously lifting and exposing new surfaces of the coal granules to the sprayed acid. After the first portion of the acid has been applied, the flow of acid is stopped, and the apparatus may be rotated for a short time to effect thorough mixing of coal and acid. It is preferable to stop the rotation of both agitator and drum for a time while the reaction proceeds and the temperature of the charge rises. If the temperature rises too fast, the agitator may be started again as this has some cooling effect on the mass. In any event, after a suitable period of reaction, this procedure may be repeated with the spraying of a second portion of the acid onto the charge while the drum is being rotated. Rotation is then continued after the second portion is completely sprayed until thorough mixing has been obtained, after which the drum is again allowed to stand.

Rotation of the agitator 19 in the drum cools the reaction mass, while allowing this mass to stand after an acid addition increases the temperature. The time of rotation, the speed of rotation of the agitator, and the time during which the drum and agitator are allowed to stand may, of course, be appropriately adjusted to control the temperature within the desired limits. Under these conditions, no external heating or cooling of the drum is needed. Under certain conditions, however, it may be desirable to utilize the jacket 37 for producing either a heating or cooling of the charge.

In order that the invention may be more fully understood, a specific example of the operation of the apparatus illustrated in Fig. 2 will be described.

The drum 18 is first charged with about 875 lbs of low moisture content coal, for example a bituminous coal containing 2% or less moisture. The total amount of acid needed is then computed on the basis of supplying to the coal a total of 3.4 lbs. of $SO_3$ per lb. of coal granules treated. The actual weight of acid employed will vary, of course, depending upon the particular strength of acid used. With 20% fuming sulfuric acid, for example, a total of about 3510 lbs. may be used. The agitator 19 and drum 18 are then started rotating slowly. During rotation of the apparatus, one-ninth of the total quantity of acid required or 390 lbs. is sprayed into the chamber through the openings or nozzles in the pipe 51 under a pressure of around 120 lbs. per square inch supplied by pump 59. The acid is practically atomized under these conditions, although no substantial quantity of air is sprayed with the acid, and is thoroughly distributed in the form of minute droplets over the coal surfaces as new surfaces are exposed by rotation of the blades 24. When one-ninth of the total quantity of acid has been sprayed in, the flow of acid is stopped and rotation of the device is continued for about 2 minutes to effect intimate mixing of the coal and acid. Rotation of the apparatus is then stopped. At the end of about fifteen minutes, total elapsed time, the temperature in the drum has risen to about 90° C., and rotation of the drum is then started again. Another one-ninth portion or 390 lbs. of the acid is sprayed in, rotation is continued, and the drum is then allowed to stand as in the first step. At the end of this time, the first step is repeated for a third time. After the third standing or reaction period, one-third of the total quantity of acid has been added.

This procedure is now repeated three more times, with the exception that in these last three stages, two-ninths of the total quantity of acid or 780 lbs. is sprayed into the apparatus at each stage. When the final two-ninths portion of acid has been added, the acid and coal are allowed to stand without agitation for about thirty minutes before the charge is dumped out of the apparatus.

This may be accomplished by rotating the drum 18 until the opening 25 is at the bottom and removing the cover 26. After the charge in the central portion of the drum has been withdrawn through the opening 25, the drum 18 may be held stationary while the agitator 19 is rotated in the proper direction to cause the helical blades 22 and 23 to force the balance of the charge toward the central portion of the drum and drop out through the opening 25.

The solid hydrogen exchanging product thus obtained is then washed with water for about 10 to 20 hours to remove excess acid and may be dried, or it may first be converted to a sodium exchanging zeolitic material with a solution of soda ash and then dried.

The dried product, in either case, may require some grinding if large coal granules were used, or in any event, screen classification may be desirable in order to separate the particles that are too small and those that are too large. Lumps that are too large may be crushed to the proper size and re-classified.

It will be understood that the parts of the apparatus described above that are exposed to acid should be made of or coated with suitable acid resistant materials.

The specific examples given herein refer to the use of an amount of acid computed to furnish about 3.4 parts of $SO_3$ per part of coal by weight, but it is to be understood that the invention is not limited thereto since ion exchange products may be obtained by using as little as 0.85 part, or even slightly less, of $SO_3$ per part of coal when the acid is sprayed on the coal, or applied by some equivalent technique.

This application is a continuation-in-part of our application Serial No. 394,640, filed May 22, 1941.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

It is claimed:

1. A process of treating coal with a concentrated form of sulfuric acid to prepare a water insoluble ion exchange product comprising agitating a mass of granular coal, adding thereto a small portion of said concentrated form of sulfuric acid, allowing the reaction to proceed with an increase in temperature, thereafter adding further portions of said concentrated form of sulfuric acid at spaced intervals with agitation until all of the acid has been added, the quantities of acid added and the intervals between addition being regulated to maintain the temperature of the mass between about 60° and 100° C. during substantially all of the reaction period, and washing excess acid out of the product thus obtained.

2. A process of preparing hard granules of carbonaceous ion exchange material comprising adding slowly to low moisture coal granules a portion of approximately 100% sulfuric acid, thereafter adding successive portions of fuming sulfuric acid, allowing substantial periods of time for reaction between the coal and each of said portions to keep the temperature from rising above about 100° C. for any substantial period of time, and washing the excess acid out of the product thus obtained.

3. A process of preparing carbonaceous ion exchange material comprising spraying a quantity of substantially anhydrous sulfuric acid over a mass of coal granules, mixing said granules and acid, spraying further quantities of substantially anhydrous sulfuric acid over said mass until enough acid has been added to supply at least about 0.85 times as much $SO_3$ as coal by weight, mixing the acid and coal after each such addition, and washing excess acid out of the solid reaction product, the rate of spraying said quantities of acid being regulated to maintain the temperature of the reacting mass from about 70 to 90° C. during the major portion of the reaction, the temperature of said reacting mass at no time exceeding about 150° C.

4. A process of preparing carbonaceous ion exchange material comprising spraying under pressure successive quantities of fuming sulfuric acid on a mass of bituminous coal granules, agitating said coal granules while said acid is being sprayed thereon, maintaining said granules and acid substantially quiescent for substantial period between the spraying of said successive quantities to allow the temperature to rise above 60° C. but not substantially above 100° C., the temperature of said mass at no time exceeding about 150° C. and washing excess acid out of the solid reaction product thus obtained, the total quantity of acid thus sprayed being equivalent to at least about 0.85 times as much $SO_3$ by weight as the weight of coal treated, and the first of said quantities of acid being smaller than other quantities of acid subsequently sprayed on said coal.

5. The process of treating coal with a concentrated liquid sulfating reagent to prepare a water-insoluble ion exchange product which comprises: agitating a mass of granular coal; adding thereto a small portion of said concentrated liquid sulfating reagent; allowing the reaction to proceed with an increase in temperature; thereafter adding further portions of said concentrated liquid sulfating reagent at spaced intervals, with agitation, until all of said concentrated liquid sulfating reagent has been added, the quantities of said concentrated liquid sulfating reagent added, and the intervals between additions being regulated to maintain the temperature of the mass between about 60° C. and 150° C. during substantially all of the reaction period; and washing excess concentrated liquid sulfating reagent out of the product thus obtained.

6. The process of treating coal with a concentrated liquid sulfating reagent to prepare a water-insoluble ion exchange product which comprises: spraying, at intervals, successive increments of finely-divided concentrated liquid sulfating reagent onto a mass of granular coal while agitating the mass; allowing the reaction to proceed with an increase in temperature; thereafter spraying further increments of said liquid sulfating agent at spaced intervals, with agitation, until all of said concentrated liquid sulfating reagent has been added, the quantities of concentrated liquid sulfating reagent added, and the intervals between additions being regulated to maintain the temperature of the mass between about 60° C. and 150° C. during substantially all of the reaction period; and washing excess concentrated liquid sulfating reagent out of the product thus obtained.

7. The process of treating coal with a concentrated form of sulfuric acid to prepare a water-insoluble ion exchange product which comprises: agitating a mass of granular coal; spraying a portion of concentrated sulfuric acid over said mass of granular coal while agitating said mass; allowing said mass to stand for a period of time; thereafter spraying further portions of said concentrated form of sulfuric acid over said mass at seleceted intervals until all of said acid has been added, the first of said portions of acid being substantially smaller than the portions added at later stages, and said agitating and standing periods being regulated to maintain the temperature of the mass between 60° C. and 150° C. during substantially all the reaction period; and washing excess acid out of the product thus obtained.

JOHN GILBERT DEAN
RANDALL HEILIGMAN.
RAY RILEY.